United States Patent
Narholz et al.

(10) Patent No.: US 9,638,467 B2
(45) Date of Patent: May 2, 2017

(54) APPARATUS FOR CONVEYING AND PRE-HEATING A METAL CHARGE FOR A MELTING PLANT AND CONNECTED METHOD

(75) Inventors: Thomas Narholz, Feldmeilen (CH); Bernard Villemin, Eggenwil (CH)

(73) Assignee: DANIELI & C. OFFICINE MECCANICHE SPA, Buttrio (IT)

( * ) Notice: Subject to any disclaimer, the term of this patent is extended or adjusted under 35 U.S.C. 154(b) by 57 days.

(21) Appl. No.: 13/992,985

(22) PCT Filed: Dec. 10, 2010

(86) PCT No.: PCT/IB2010/003206
§ 371 (c)(1),
(2), (4) Date: Sep. 19, 2013

(87) PCT Pub. No.: WO2012/076920
PCT Pub. Date: Jun. 14, 2012

(65) Prior Publication Data
US 2014/0010255 A1    Jan. 9, 2014

(51) Int. Cl.
*F27D 13/00* (2006.01)
*F27D 3/00* (2006.01)
(Continued)

(52) U.S. Cl.
CPC .............. *F27D 13/00* (2013.01); *C21C 5/527* (2013.01); *C21C 5/565* (2013.01); *F27B 3/183* (2013.01);
(Continued)

(58) Field of Classification Search
CPC ..... C21C 5/527; C21C 5/565; C21C 2100/00; F27B 3/183; F27B 3/18; F27D 13/00; F27D 13/002; Y02P 10/216
(Continued)

(56) References Cited

U.S. PATENT DOCUMENTS 3,144,243 A * 8/1964 Henson .................. C21D 1/767
432/152
3,301,662 A    1/1967 Ban
(Continued)

FOREIGN PATENT DOCUMENTS

DE    1020080371111    2/2010
IT    1359081    3/2005
(Continued)

OTHER PUBLICATIONS

International Search from Application No. PCT/IB2010/003206 mailed Aug. 25, 2011.
(Continued)

*Primary Examiner* — Hung D Nguyen
(74) *Attorney, Agent, or Firm* — Calfee Halter & Griswold LLP (57) ABSTRACT

Apparatus for continuously conveying and pre-heating a metal charge inside a container of a melting plant, includes at least a channel for conveying the metal charge, at least a hood disposed above the conveyor channel defining a tunnel and/or an expansion chamber, inside which at least part of the fumes exiting from the container advance, and apertures made in cooperation with lateral walls of the conveyor channel to discharge the fumes. The conveyor channel includes an activator that divert the fumes and/or delimit the zone occupied by the metal charge of the conveyor channel, and that cooperate longitudinally with at least part of the conveyor channel.

7 Claims, 7 Drawing Sheets

(51) Int. Cl.
*C21C 5/52* (2006.01)
*C21C 5/56* (2006.01)
*F27B 3/18* (2006.01)
*F27D 17/00* (2006.01)

(52) U.S. Cl.
CPC ......... *F27D 13/002* (2013.01); *F27D 17/003* (2013.01); *C21C 2100/00* (2013.01); *Y02P 10/216* (2015.11)

(58) Field of Classification Search
USPC ...... 373/79, 80, 81, 115, 123, 1, 2, 63, 142; 75/10.12, 10.15, 10.63; 266/88, 44, 158, 266/200, 205, 261; 432/93, 87, 121, 126, 432/138, 141, 144, 152, 159, 242, 120, 432/32, 17, 239, 245, 1, 11; 110/227, 110/228, 257, 270, 108, 258, 271, 293; 219/653
See application file for complete search history.

(56) References Cited

U.S. PATENT DOCUMENTS

| | | | |
|---|---|---|---|
| 4,083,675 | A | 4/1978 | Fellnor et al. |
| 4,135,702 | A | 1/1979 | Venetta et al. |
| 5,647,288 | A | 7/1997 | Matsumoto et al. |
| 2001/0055739 | A1 | 12/2001 | Vallomy |
| 2010/0028821 | A1 | 2/2010 | Gavenda et al. |
| 2013/0328251 | A1 | 12/2013 | Narholz et al. |
| 2014/0010255 | A1 | 1/2014 | Narholz et al. |

FOREIGN PATENT DOCUMENTS

| | | | |
|---|---|---|---|
| JP | 8157930 | | 11/1996 |
| JP | 08285477 | A * | 11/1996 |
| JP | 09159376A | H | 6/1997 |
| WO | 9409332 | | 4/1994 |
| WO | 2006089897 | | 2/2006 |
| WO | 2006089867 | | 8/2006 |
| WO | WO 2011091685 | A1 * | 8/2011 |

OTHER PUBLICATIONS

Written Opinion from Application No. PCT/IB2010/003206 mailed Aug. 25, 2011.
Office Action from Chinese Patent Application No. 201080071198.2 dated Nov. 19, 2014.
Notice of Preliminary Rejection from Korean Patent Application No. 10-2013-7017798 dated Jun. 27, 2014.
Office Action from Mexican Patent Application No. MX/A/2013/006397 dated Jan. 7, 2015.
International Search Report from Application No. PCT/IB2010/003197 mailed Mar. 28, 2011.
Written Opinion from Application No. PCT/IB2010/003197 mailed Mar. 28, 2011.
International Search Report from Application No. PCT/IB2010/003207 mailed Sep. 27, 2011.
Written Opinion from Application No. PCT/IB2010/003207 mailed Sep. 27, 2011.
Office Action from U.S. Appl. No. 13/992,956 dated Mar. 19, 2015.
Response to Office Action from U.S. Appl. No. 13/993,011 dated Nov. 20, 2015.
Response to Office Action from U.S. Appl. No. 13/992,956 dated Aug. 19, 2015.
Office Action from U.S. Appl. No. 13/992,956 dated Sep. 24, 2015.
Office Action from U.S. Appl. No. 13/993,011 dated Aug. 20, 2015.

* cited by examiner fig. 4 fig. 5 fig. 8 fig. 9 fig. 10

APPARATUS FOR CONVEYING AND PRE-HEATING A METAL CHARGE FOR A MELTING PLANT AND CONNECTED METHOD

CROSS-REFERENCE TO RELATED APPLICATION

This application is the U.S. national phase entry of PCT/IB2010/003206, with an international filing date of 10 Dec. 2010, the entire disclosure of which is fully incorporated herein by reference.

FIELD OF THE INVENTION

The present invention concerns an apparatus, and the connected method, for continuously pre-heating and conveying a metal charge, such as iron scrap, hot or cold sponge iron (DRI), pig iron or other, inside a container, which is advantageously a melting furnace, for example an electric arc furnace.

BACKGROUND OF THE INVENTION

Apparatuses of the vibratory or oscillating type are known, to convey a metal charge to a container of a melting plant, which is advantageously a melting furnace.

Such known apparatuses provide a segment long enough to pre-heat the metal charge sufficiently, by means of fumes exiting from the furnace, while it is being conveyed.

Each of the known apparatuses comprises a bearing structure on which a conveyor channel is mounted, having a substantially U-shaped cross section or similar.

At least part of the conveyor channel is covered at the upper part by one or more hoods that can define a tunnel into which the fumes exiting from the melting furnace flow, in the direction opposite to that in which the metal charge advances, and carry out the pre-heating.

The conveyor channel is provided along the lateral walls with apertures communicating with suction channels connected to fume suction devices.

The fume suction devices create a depression inside the suction channels and, through the apertures present in the lateral walls of the conveyor channel, take in the fumes of the hoods so that they pass through the metal charge and heat it.

However, Applicant has found that this solution does not obtain the best result possible since the lower and central part of the metal charge is not hit by the hot fumes, or is only partly hit by them, leaving a considerable central zone on the bottom of the conveyor channel which is substantially cold.

A plant of the above type is also known in which the conveyor channel, at its bottom, has apertures to discharge the fumes that are directly connected to the fume suction device. The fumes taken in by the suction device substantially hit the whole metal charge and also affect its bottom portion.

The apertures made on the bottom of the conveyor channel cause fragments of charge to fall inside the suction channels, and therefore they must be cleaned frequently, with the consequent problem of stopping the plant.

Another disadvantage is that parts of the metal charge can obstruct these apertures, thus preventing a homogeneous heating.

Applicant has set himself the purpose of obtaining a more extensive and more homogeneous heating of the metal charge in order to increase the yield of the plant, reducing the energy necessary for the subsequent melting in the melting furnace.

Another purpose of the present invention is to greatly reduce, if not eliminate, problems connected to the maintenance of the plant.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

The present invention is applied to apparatuses which, above the conveyor channel, have either a fume conveyor tunnel or, alternatively, a fume expansion chamber.

In accordance with these purposes, an apparatus for conveying a pre-heated metal charge inside a container of a melting furnace comprises at least a conveyor channel, in which the metal charge is able to advance continuously, and a hood that is disposed above the conveyor channel so as to define with it the tunnel or expansion chamber inside which at least part of the fumes exiting from the container are made to flow in counter-flow.

The fumes present in the tunnel or expansion chamber are taken in by apertures that cooperate with lateral, vertical or sub-vertical walls of the conveyor channel, so that they pass through the metal charge along the whole of its length, heating it.

According to a characteristic feature of the present invention, the conveyor channel cooperates with activator means which can be activator means that divert the fumes and/or activator means that delimit the zone occupied by the metal charge. The activator means are able to eliminate, or at least greatly reduce, the portion of metal charge that remains substantially cold after the fumes have passed through, or to eliminate that zone of the metal charge that the fumes do not pass through.

It is advantageous to provide that the activator means extend longitudinally inside the conveyor channel for the whole of its length or at least for a good part of the longitudinal extension of the tunnel or expansion chamber.

According to a first embodiment, the diverter activator means comprise fume conveyor walls that, from the tunnel or chamber, extend convergent, that is, in a sub-vertical manner, toward the bottom of the conveyor channel, thus obliging the fumes to hit the central part of the metal charge before exiting through the apertures present in the lateral walls of the conveyor channel.

According to a variant, the conveyor walls are the lateral walls of the conveyor channel.

According to another variant, the conveyor walls converge into the conveyor channel.

According to another embodiment, the delimiter activator means cooperate with the central zone of the bottom wall of the conveyor channel.

The delimiter activator means extend vertically toward the tunnel or toward the chamber and prevent the metal charge from being present near the bottom wall of the conveyor channel.

The delimiter activator means occupy the substantially central part of the bottom of the conveyor channel, with a desired shape that can be triangular, rectangular, polygonal, bell-shaped or triangular with curved sides etc.

The delimiter activator means can cooperate directly with the fumes, or occupy only one space.

When they cooperate with the fumes, they have vertical or sub-vertical walls in which suction passages or apertures are provided, which cooperate with the fume suction means.

According to one feature of the invention, the fumes exiting from the activator means advantageously cooperate with suction channels where the fumes expand.

The present invention also concerns the relative method to convey and pre-heat the metal charge inside the container of a melting plant.

The method comprises at least a step of continuously conveying the metal charge inside the container, a step of conveying the fumes exiting from the container inside a tunnel or chamber, disposed above the conveyor channel, and a step where the fumes pass through the metal charge, due to the effect of a suction action exerted by suction means, through apertures cooperating with the conveyor channel.

According to one feature of the method, during the step when the fumes are passing through, activator means are used to eliminate, or at least reduce, the quantity of metal charge that remains cold, or at a lower temperature than the whole of the metal charge, after the fumes have passed through.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify common elements in the drawings that are substantially identical. It is understood that elements and characteristics of one form of embodiment can conveniently be incorporated into other forms of embodiment without further clarifications.

DETAILED DESCRIPTION OF A
PREFERENTIAL FORM OF EMBODIMENT

With reference to the attached drawings, the reference number 10 denotes in its entirety a conveying and pre-heating apparatus according to the present invention.

The apparatus 10 (FIG. 1) is installed in a melting plant 11, of a substantially known type that comprises a melting furnace 12, for example of the electric arc type, fed laterally through a loading aperture 14, with a metal charge 13 transported by the apparatus 10.

Figure 1:
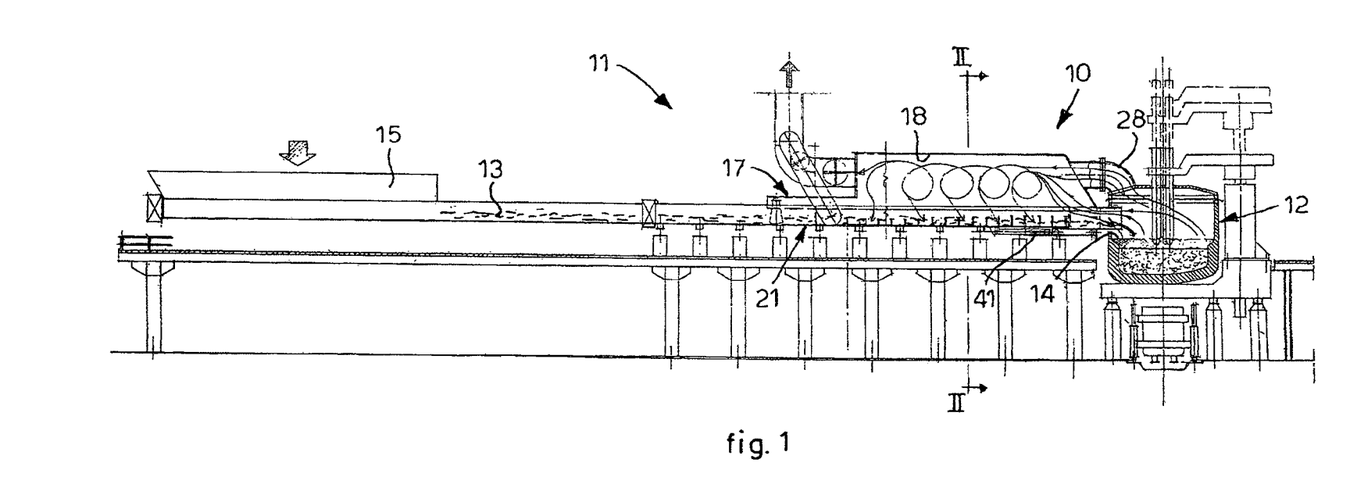
FIG. 1 is a schematic lateral view of a melting plant to which a conveying and pre-heating apparatus according to the present invention is applied.

In this case, the plant 10 comprises a loading module 15, to load the metal charge 13 into a conveyor channel 21 of the apparatus 10.

In the conveyor channel 21 the metal charge 13 is pre-heated and introduced into the melting furnace 12.

A vibration device 41 of a known type is associated with the conveyor channel 21 and, by means of a vibratory or oscillatory movement in a longitudinal direction, makes the metal charge 13 advance inside the melting furnace 12.

The apparatus 10 also comprises one or more hoods 17, disposed above the conveyor channel 21 into which the fumes exiting from the melting furnace 12 are introduced.

The hood 17 (FIG. 2) defines an expansion chamber 18 that extends above the metal charge 13 and is suitable to slow down the fumes and keep them inside it for a desired time before they impact against the metal charge 13. The minimum time is necessary to complete the combustion of non-combusted gases present in the fumes and to promote the deposit of particulate and powders.

The present invention is also applicable when the hood 17 (FIG. 3) is disposed immediately above the metal charge 13 to define a tunnel for the passage of the fumes, so that the metal charge 13, or at least the surface layers thereof, is hit directly by the hot fumes arriving from the melting furnace 12.

A connection pipe 28 is associated with the apparatus 10 (FIG. 1), which connects the fourth hole of the melting furnace 12 with the expansion chamber 18 and, when the loading aperture 14 is closed, allows to convey almost all the fumes produced inside the melting furnace 12 directly inside the expansion chamber 18.

Figure 2:
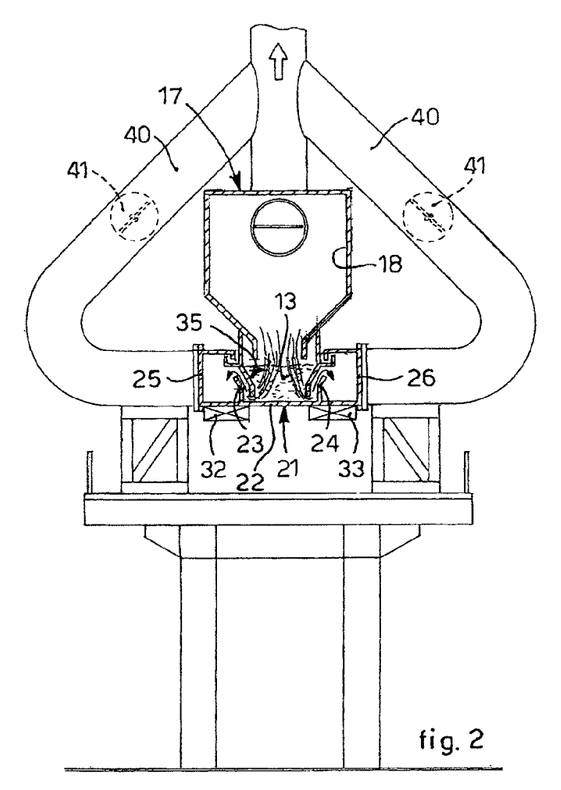
FIG. 2 is a section view from II to II of FIG. 1.
Figure 3:
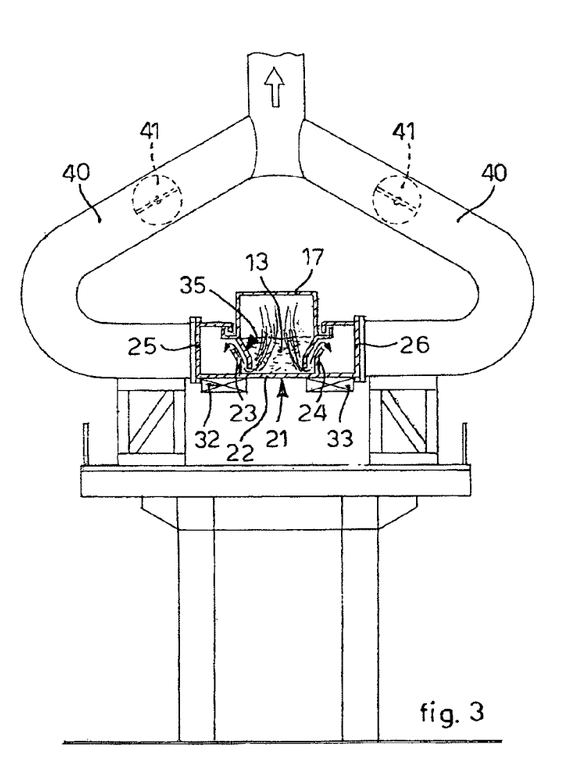
FIG. 3 shows a variant of FIG. 2.

The conveyor channel 21 comprises a bottom wall 22, substantially horizontal, and two lateral walls 23 and 24 which define in this case a substantially U-shaped cross section (FIGS. 2 and 3).

Along the whole length of the conveyor channel 21, at the side of the lateral walls 23 and 24 of the conveyor channel 21, suction pipes 25 and 26 are provided, connected to fume discharge pipes 40.

The discharge pipes 40 are connected to fume suction and filtering plants, of a known type, and have valve members 41 to regulate the fume suction level.

In the form of embodiment shown in FIGS. 2 and 3, the suction pipes 25 and 26 are made in a single piece with the conveyor channel 21 and can be provided with vibration members 32 and 33 (FIG. 3) so as to prevent, or at least limit, the sedimentation of powders or other impurities inside them.

In other forms of embodiment (FIGS. 4, 5, 8, 9 and 10), the conveyor channel 21 is made as a separate element with respect to the suction channels 25 and 26.

In this last case, sealing members 42 of a hydraulic and substantially known type are interposed between the conveyor channel 21 and the suction channels 25 and 26 to guarantee the fumes are sealed.

The conveyor channel 21, advantageously for the whole of its length, has activator means 35 able to reduce the quantity of scrap in the central zone that stays cold during the passage of the fumes through the metal charge 13.

Figure 4:
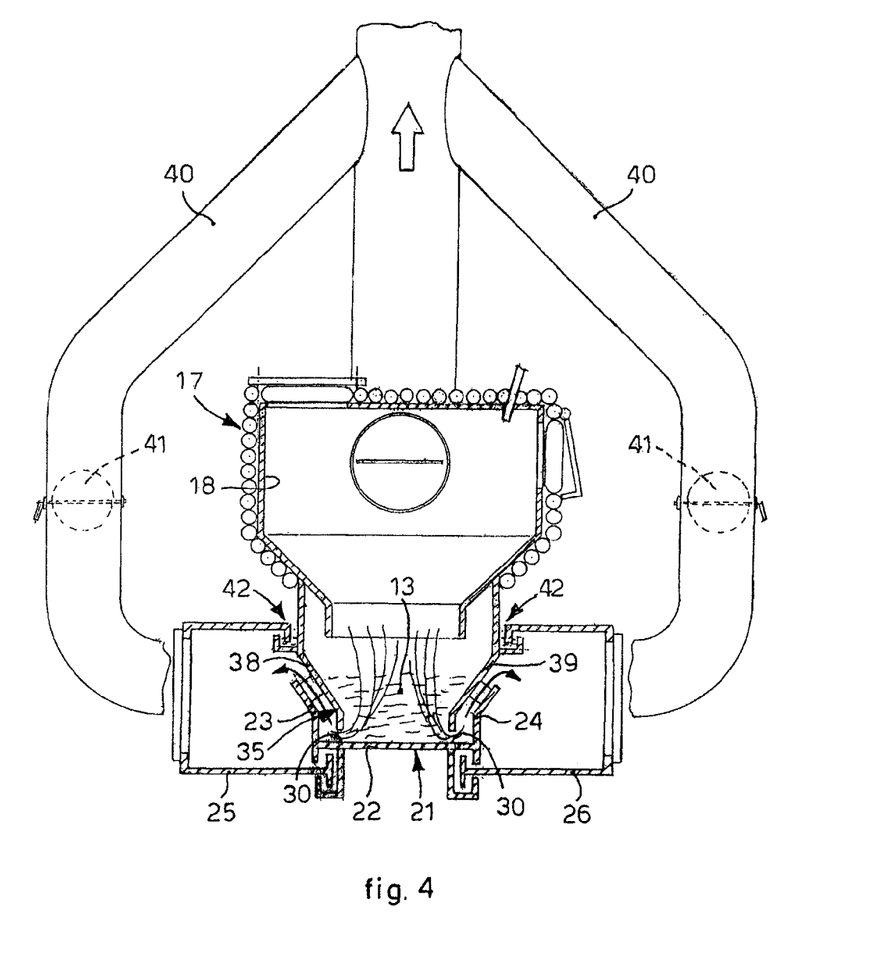
FIG. 4 is an enlarged view of FIG. 2.

In the case shown in FIGS. 2, 3 and 4, the activator means 35 are diverters to divert the stream of fumes, and comprise two conveyor walls 38 and 39, associated with the expansion chamber 18 and disposed inclined and convergent toward the bottom wall 22.

In this way, near the convergent ends of the conveyor walls 38 and 39 (FIG. 4), there is a narrower section which limits the quantity of metal charge remaining cold in the central zone on the bottom of the conveyor channel 21.

The conveyor walls 38 and 39 extend in a vertical direction, defining with the bottom wall 22 an aperture 30 that extends longitudinally for the whole length of the conveyor channel 21.

The fumes present in the expansion chamber 18, due to the effect of the suction exerted by the suction channels 25 and 26 and the effect of the convergence of the conveyor walls 38 and 39, are obliged to converge toward the central part of the bottom wall 22 of the conveyor channel 21, heating substantially all the metal charge 13 in a uniform and homogeneous manner. This allows to eliminate the zone of the metal charge 13 that remains substantially cold, or at low temperature, compared with the whole of the metal charge 13.

The lateral walls 23 and 24 (FIGS. 2, 3 and 4), in cooperation with the respective conveyor walls 38 and 39, define a labyrinth-type seal the function of which is to oblige the fumes that have passed through the metal charge 13 to follow a labyrinth-type path to lower their speed and allow to deposit the powders or smaller fragments of metal charge carried in suspension. The labyrinth-type seals therefore exert a prior filtering action on the fumes.

In another form of embodiment (FIG. 5), the conveyor walls 38 and 39 are made in a single piece with the conveyor channel 21, so as to reduce friction between metal charge 13 and conveyor walls 38 and 39.

Figure 5:
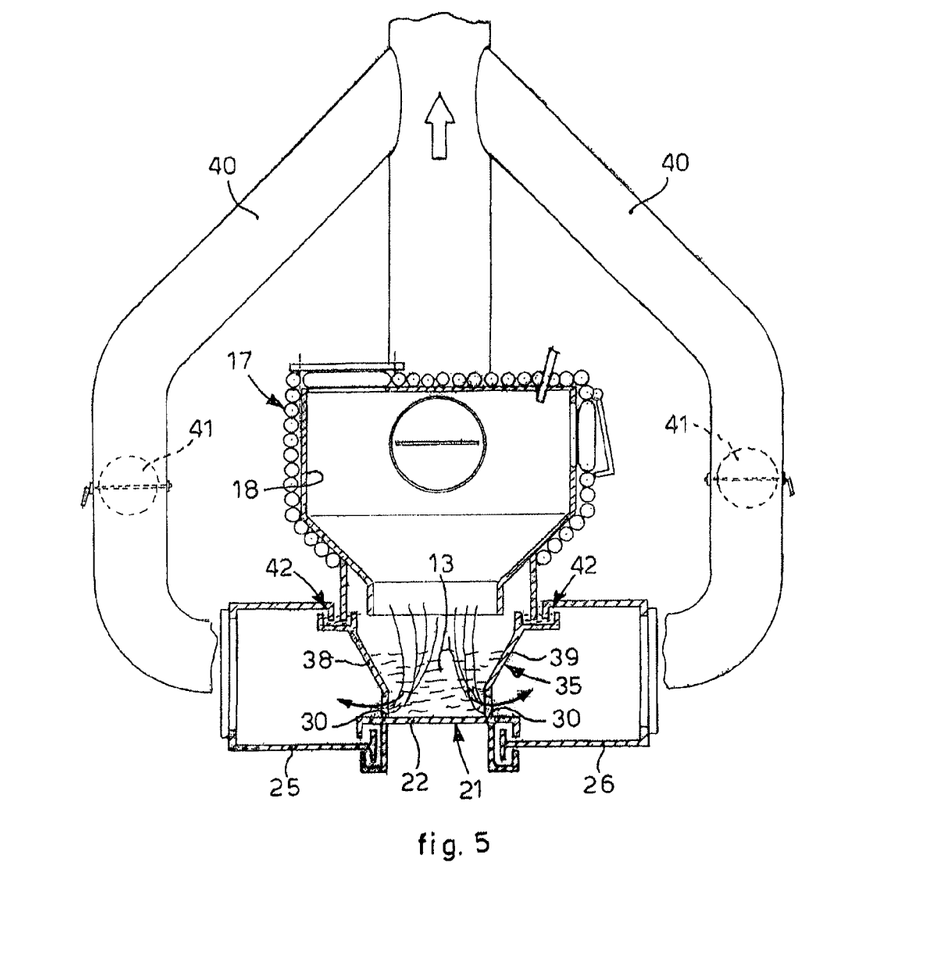
FIG. 5 is a first variant of FIG. 4.
Figure 6:
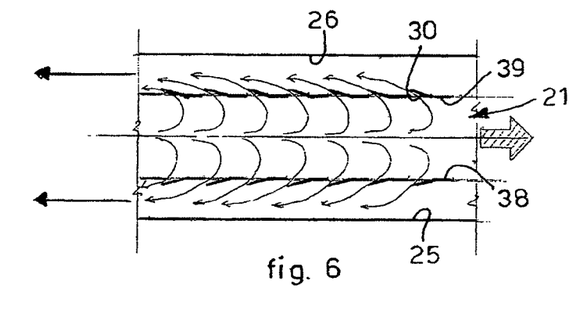
FIG. 6 is a schematic plane view of a detail in FIG. 5.
Figure 7:
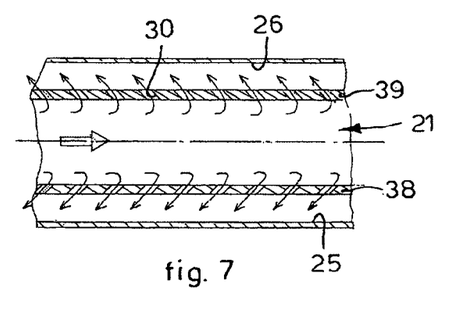
FIG. 7 shows a variant of FIG. 6.

In this case the two conveyor walls 38 and 39, on their ends, have apertures 30 conformed as shown in FIG. 6 or, in another form of embodiment, as in FIG. 7, and such that during the advance of the metal charge 13, parts of the latter do not enter into the suction channels 25 and 26. The apertures 30 can also be governed by means that regulate their opening gap so as to control the fume suction level.

In another form of embodiment (FIG. 8), instead of providing conveyor walls 38 and 39 of the above type, a conveyor channel 21 comprises delimiter activator means or, in this case, an interposition element 135 made in a single piece with the bottom wall 22, substantially in proximity with its central zone, and which extends longitudinally for the whole length of the conveyor channel 21.

The interposition element 135 (FIG. 8) extends toward the upper part of the expansion chamber 18 and in this case is substantially triangular in shape, rounded at the top. In other embodiments, the shape of the interposition element 135 can be, simply to give an example, rectangular, polygonal, curved, bell-shaped or mixed.

Figure 8:
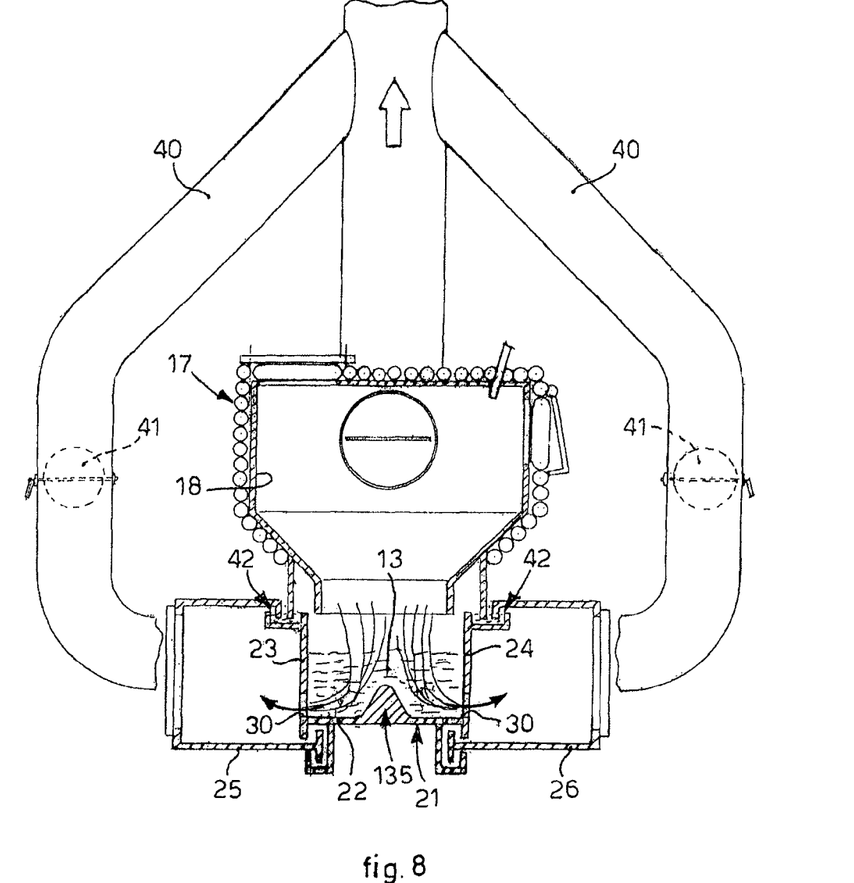
FIG. 8 shows a second variant of FIG. 5.

The interposition element 135, like the conveyor walls 38 and 39 described above, prevents the formation of a central portion of the metal charge 13 on the bottom of the conveyor channel 21 which is not hit by the fumes and therefore is not heated.

On its lateral walls 23 and 24 and near the bottom wall 22, the conveyor channel 21 has apertures 30 conformed as described above with reference to FIGS. 6 and 7, through which the fumes are taken in.

In another form of embodiment (FIG. 9), a conveyor channel 21 is provided with delimiter activator means 235 which comprise an aperture 252, made on the bottom wall 22 of the conveyor channel 21, and a cover element 251 for the aperture 252 which is suitable to prevent parts of the metal charge 13 from exiting through the aperture 252. The cover element 251 defines gaps through which the fumes passing through the metal charge 13 can pass. In particular, the aperture 252 is connected by means of a suction chamber 253 disposed below the bottom wall 22 to at least one of the two suction channels 25 and 26.

Figure 9:
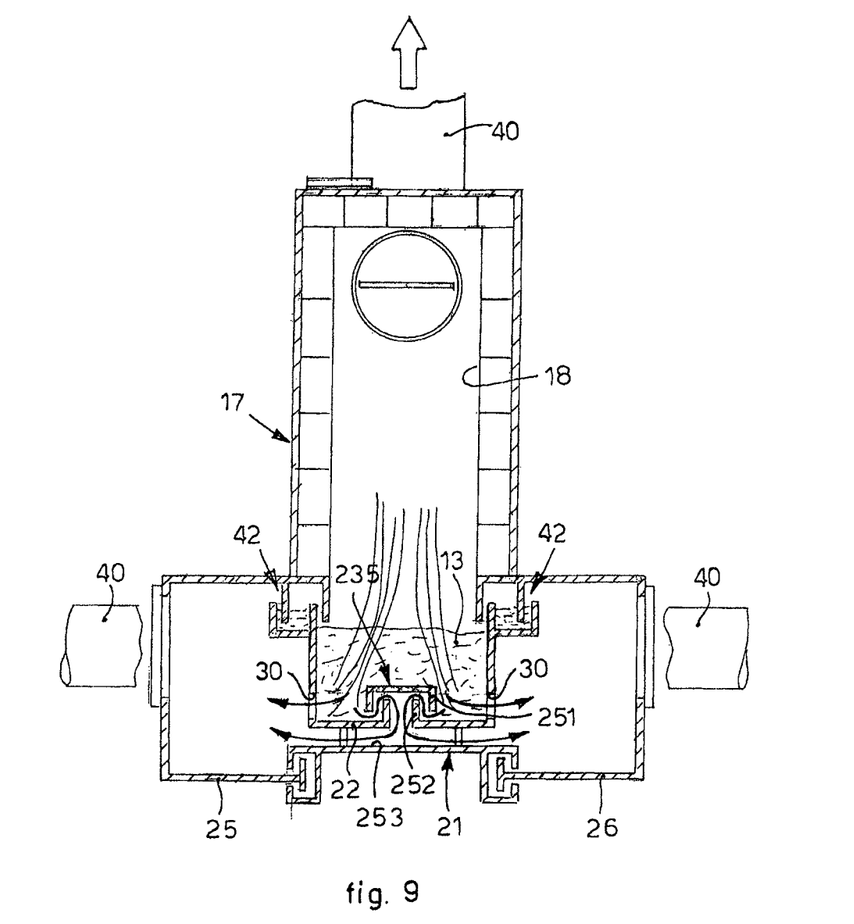
FIG. 9 shows a third variant of FIG. 5.

Due to the effect of the suction of the suction channels 25 and 26, a part of the fumes, after passing through the metal charge 13, exits from the apertures 30 present on the lateral walls 23, 24, while the other part exits from the interposition element 250 through the gaps defined by the cover element 250.

The fumes thus pass through the metal charge 13 in a substantially uniform manner, eliminating cold zones.

In this case the cover element 251 is substantially C-shaped although in other forms of embodiment it is possible to provide other shapes, such as, simply to give an example, triangular, polygonal, semi-circular or other.

It is clear that modifications and/or additions of parts may be made to the apparatus 10 as described heretofore, without departing from the field and scope of the present invention.

Figure 10:
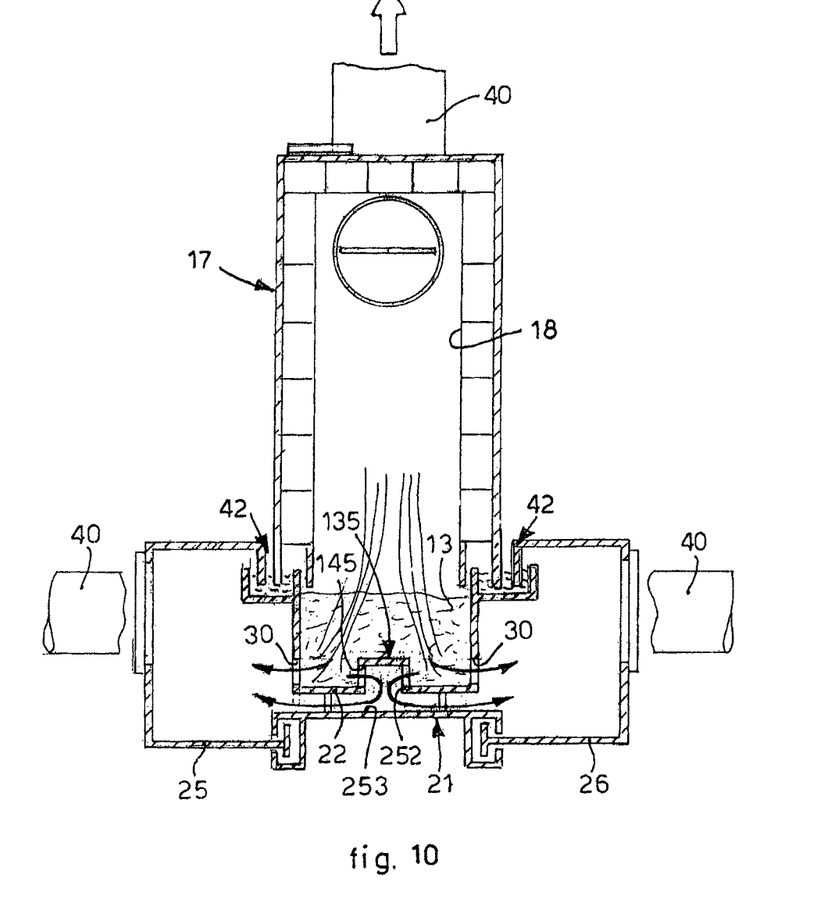
FIG. 10 shows a fourth variant of FIG. 5.

For example, in FIG. 10 it is possible to provide that the interposition element 135 described with reference to FIG. 8 is provided with gaps 145 made on its vertical or sub-vertical walls, if the interposition element 135 has a different form. The bottom wall 22 is provided with at least a second aperture 252 through which the fumes passing through the gaps 145 can pass, being taken in by the suction chamber 253, as described with reference to FIG. 9.

It is also clear that, although the present invention has been described with reference to some specific examples, a person of skill in the art shall certainly be able to achieve many other equivalent forms of apparatuses, having the characteristics as set forth in the claims and hence all coming within the field of protection defined thereby.

The invention claimed is:

1. An apparatus for continuously conveying and pre-heating a metal charge inside a container of a melting plant, comprising:
   a conveyor channel having lateral walls and a bottom wall that define a substantially U-shaped cross section,
   a hood disposed above said conveyor channel defining an expansion chamber, inside which at least part of fumes exiting from said container advance,
   apertures defined by said lateral walls of said conveyor channel,
   an elongate activator extending longitudinally along at least part of the conveyor channel, wherein said activator comprises elongate conveyor walls extending longitudinally along a length of the activator, the elongate conveyor walls are inclined and convergent to each other and toward said bottom wall of said conveyor channel bottom, so that a narrower section formed near convergent ends of the conveyor walls limits the quantity of metal charge remaining cold in a central zone on the bottom of the conveyor channel.

2. The apparatus of claim 1 wherein said activator extends longitudinally for substantially the entire length of the conveyor channel.

3. The apparatus of claim 1 wherein said conveyor walls define with said bottom wall one of said apertures that extends longitudinally for the substantially the entire length of said conveyor channel.

4. The apparatus of claim 3 wherein said conveyor walls in cooperation with said lateral walls define a labyrinth-type seal.

5. The apparatus of claim 4 wherein said conveyor walls are made in a single piece with said conveyor channel.

6. An apparatus for continuously conveying and pre-heating a metal charge inside a container of a melting plant, comprising:

an elongate conveyor channel having lateral walls and a bottom wall that define a substantially U-shaped cross section, wherein said bottom wall has a central portion, a hood disposed above said conveyor channel defining an expansion chamber, inside which at least part of the fumes exit from said container advance, lateral apertures defined by lateral walls of said conveyor channel, an elongate activator extending longitudinally along at least part of a length of the conveyor channel, and at least one suction aperture extending longitudinally along and beneath at least part of a length of the elongate activator, wherein the suction aperture is disposed on the bottom wall and is substantially in proximity to the central portion the bottom wall, wherein the elongate activator further comprises at least one lateral opening contacting with the metal charge, wherein the lateral opening has a fluid communication with the suction aperture.

7. The apparatus as in claim 6 further comprising suction means in communication said at least one suction aperture.

\* \* \* \* \*